United States Patent [19]

Bigelow

[11] 4,018,453
[45] Apr. 19, 1977

[54] QUICK RELEASE LOCKING DEVICE

[76] Inventor: Leon J. Bigelow, 1305 Emden St., Wilmington, Calif. 90744

[22] Filed: Feb. 12, 1976

[21] Appl. No.: 657,551

[52] U.S. Cl. .............................. 280/512; 403/143; 114/249; 114/230; 74/532

[51] Int. Cl.² .......................................... B60D 1/10

[58] Field of Search .......... 280/512, 513, 508, 509; 114/235 A, 230; 403/143, 122; 74/532, 531, 527

[56] References Cited

UNITED STATES PATENTS

| 1,549,377 | 8/1925 | Peel | 74/532 |
|---|---|---|---|
| 3,567,253 | 3/1971 | DePrydt | 280/512 |
| 3,912,302 | 10/1975 | Patterson | 280/508 |

Primary Examiner—Robert R. Song
Attorney, Agent, or Firm—J. B. McGuire

[57] ABSTRACT

Apparatus for locking and holding structures to one another in a releasable manner, including a separable element which may be fastened to each of the structures. One of the elements may be a generally spherical member, similar to the ball fixture utilized in cooperation with a trailer hitch. The other fixture includes a housing with a dual-acting or compound motion mechanism pivotally mounted therein. The mechanism may comprise a gate having a locking surface which cooperates with a locking seat in the housing to receive and lock the spherical element therebetween. A locking mechanism may be movably mounted on the gate to limit the movement of the latter as well as to fix it in the locking position.

19 Claims, 4 Drawing Figures

QUICK RELEASE LOCKING DEVICE

BACKGROUND OF THE INVENTION

The present invention relates to a device which may be used to releasably fix two relatively movable structures together. Although the following discussion will be generally directed to the use of such a device for mooring a boat to a dock, it should be understood that the use of the invention is not so limited and that it may be employed in many other environments, such as when attaching an automobile to a trailer, an aircraft to a tractor, etc.

Based upon that understanding, it is believed that the invention has a very practical application in mooring a boat or vessel of any size to a dock, wharf, pier, etc., or even to another vessel.

Those familiar with boats and ships are aware of the fact that it is presently required that such vessels normally be tied to the dock when not actually in use, in order to prevent them from floating away, damaging other vessels, etc. Often, this is a rather demanding task requiring that the vessel be positioned properly relative to the pier, several lines passed between the vessel and the pier, and suitable knots and/or hitches formed in the lines to secure them. This, of course, requires the use of a number of deck hands. Normally, the larger the ship, the more deck hands necessary, both aboard ship and on the dock. Of course, for small boats, a single deck hand may be all that is necessary. However, in the class of boats commonly referred to as "yachts," and particularly the larger yachts, it is nearly imperative to have one deck hand operating the engines and one or more deck hands handling the lines. Of course, this sometimes means that it is impossible for one person to take a boat out by himself and then bring it back and dock it.

In any event, it is often very difficult to dock such vessels and it is the purpose of the present invention to provide a novel machine which will allow a single person to dock a boat or even a very large ship, the size of the locking elements being adjusted accordingly.

SUMMARY OF THE INVENTION

The present invention relates to such a device which is relatively inexpensive to produce and simple to maintain. In one manner of use, the machine might, for example, be mounted upon a dock for cooperation with a spherical element which can be fixed to the vessel to be moored. In one simple embodiment, the spherical element may simply be a trailer-type ball or spheroid which may be connected to the vessel in any suitable manner.

Preferably, the locking machine may provide a "target" toward which the helmsman may direct or aim his vessel and, more specifically, the spherical element mounted on the vessel. The machine may employ a funnel-like element which will cooperate with the sphere to direct it toward the center thereof and into a locking seat in the machine.

In this preferred embodiment, the locking seat may be integral with or attached to a housing which, if desired, may be employed to prevent the mechanism from being damaged by the elements, inadvertent collisions of vessels with the dock, etc. In any event, a gate member may be positioned so as to cooperate with the locking seat to both receive and be actuated by the sphere and to hold the sphere between a seating or locking surface on the gate and the locking seat.

In this preferred embodiment, the gate may be pivotly mounted within the housing and, in turn, a locking bar may be pivotly connected to the gate. The locking bar may be L-shaped and may be connected to a manual or electrical release apparatus on one leg and have a locking slot or detent-cooperating means on the other leg. Biasing means may be provided which tend to pull the gate toward a sphere-released position, while other biasing means may tend to pull the locking bar in a direction so that the gate is retained in a sphere-captured position.

In normal use, when a sphere is directed toward the locking seat by the funnel-like structure, it will contact the locking surface on the gate, tending to move the latter about its pivot in the housing. Sufficient movement will cause the gate to pivot to such an extent that the sphere will be trapped between the gate and the locking surface. When this occurs, the gate will tend to move the locking bar into such a position that its biasing means will force the locking slot thereon into cooperation with a rod fixed within the housing, thereby preventing movement of the gate until the device is deliberately released. If desired, the locking bar can be released by the imposition of a low level of manual force exerted through a wire rope, small line, etc. This action will cause the gate to pivot into an intermediate position. Consequently, when the vessel begins to move away from the dock, pulling the spheroid with it, the latter will tend to pivot the gate into the fully opened position and allow the sphere to be released.

Upon pursual of the following Detailed Description, taken together with the accompanying drawings, those skilled in the art will quickly become aware that the present invention, for all its simplicity, is quite remarkable in its ability to be employed in structure which receives and firmly fixes two relatively movable structures together, while allowing those structures to be very quickly and simply released when desired. Other objects of this invention, as well as additional embodiments thereof, will quickly become apparent to those skilled in the art upon reading the following Detailed Description, taken together with the accompanying drawings.

DETAILED DESCRIPTION

Figure 1:
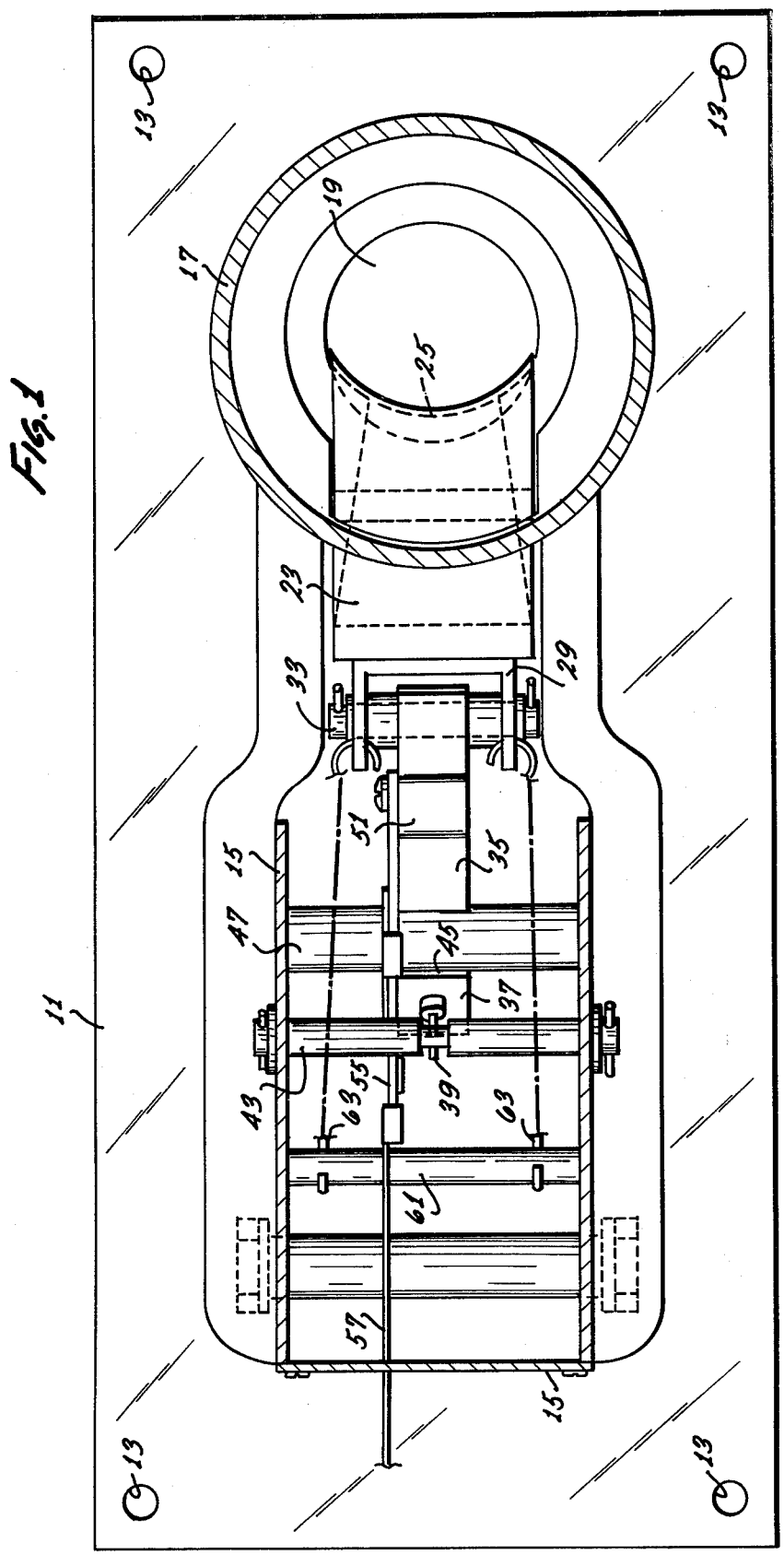
FIG. 1 comprises a side elevation, broken away at portions for the sake of clarity, of a preferred embodiment of the present invention.

Referring now to the drawings in greater detail, FIG. 1 illustrates a preferred embodiment of the present invention which, if desired, includes a plate 11 which may have apertures 13 therein by means of which the plate can be fixed to the side of a pier. In cases where there is a likelihood of change of the water level relative to the pier, the plate may be mounted upon a movable element which, in turn, may be fixed to the pier so that the plate is free to move vertically but, preferably, not horizontally. As stated previously, those skilled in the art will realize that there are many applications for the present invention beyond that described here.

In the illustrated embodiment, a housing 15 may be suitably fixed to the plate 11. At one end of the housing, a funnel-like structure 17 may be located which terminates adjacent a locking seat 19.

Figure 3:
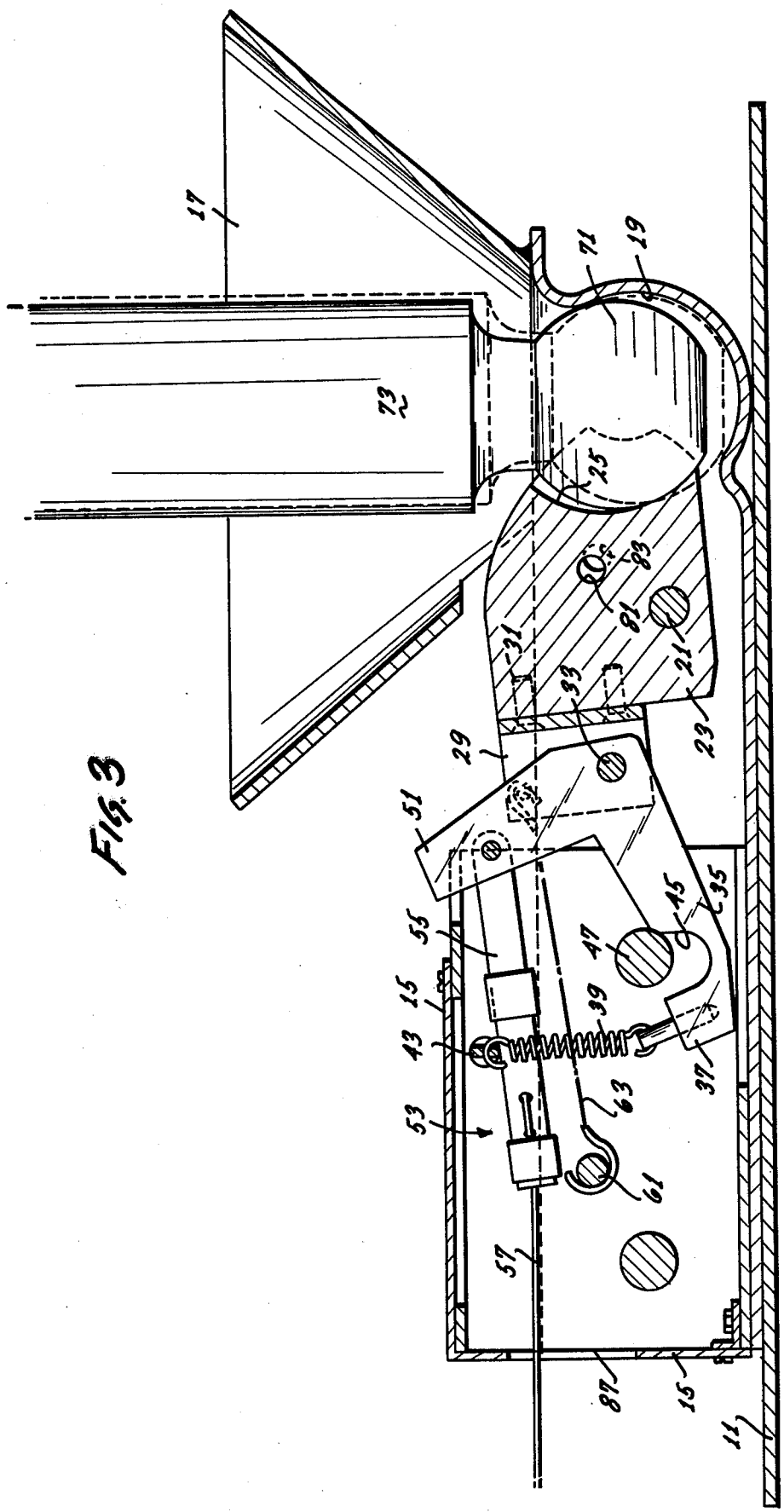
FIG. 3 comprises a view similar to FIG. 2, with the device partially unlocked so that a spherical element may be released therefrom merely by exerting a pulling force upon it.
Figure 4:
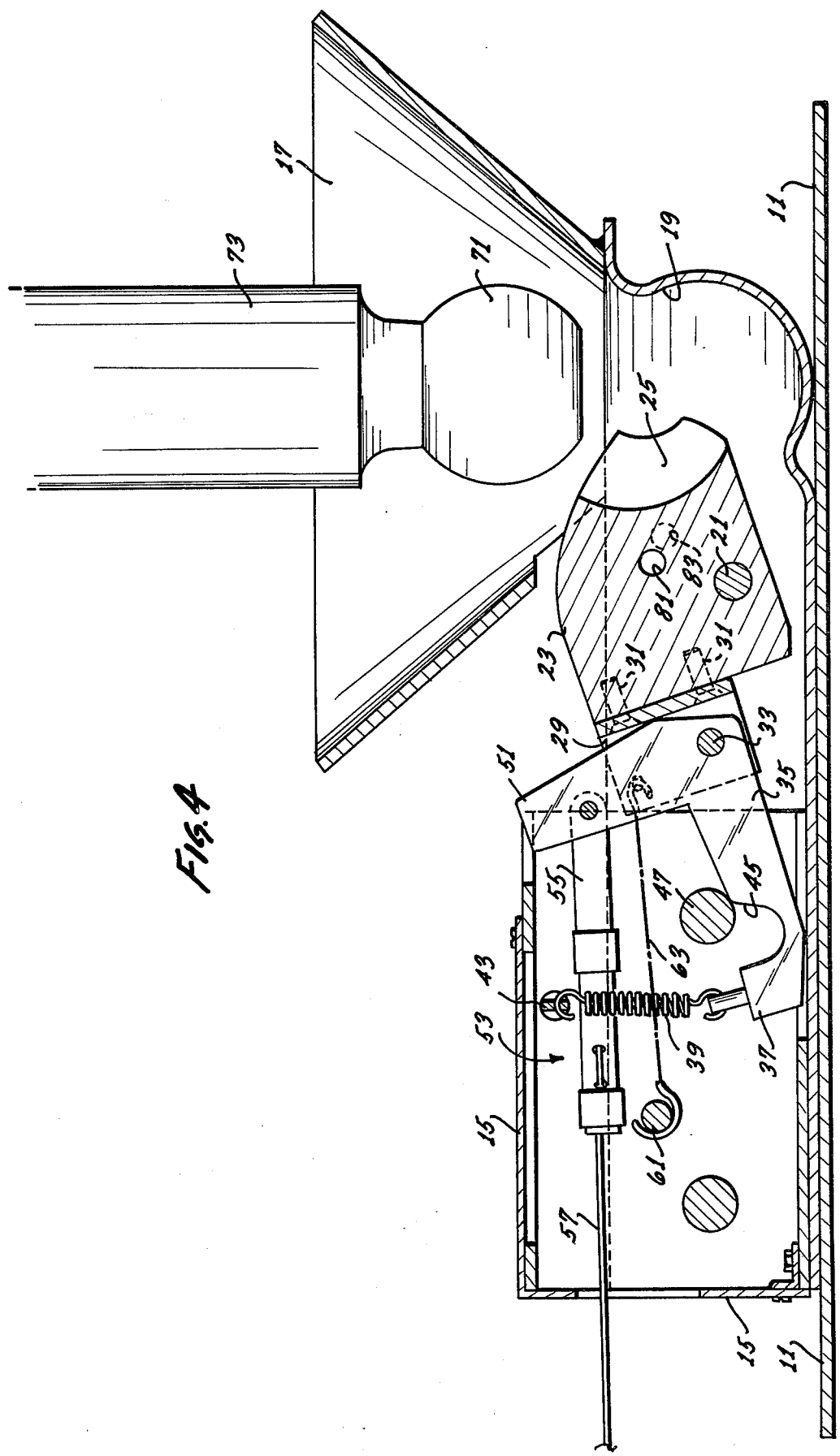
FIG. 4 comprises a view, similar to FIG. 2, with the spherical element fully released from the device.

Situated within the housing 15 so as to pivot about a rod 21 (FIGS. 2–4), a movable gate 23 may be provided having a seating or locking surface 25 thereon which may be, as particularly illustrated in FIG. 4, substantially the same radial dimension as the locking seat 19. Together, the locking seat and the seating surface 25 comprise a partially spherical enclosure for a purpose to be described.

At the end of the gate 23 distal from the seating surface 25, a substantially U-shaped saddle 29 may be fixed to the gate, for example by bolts 31. A second pivot rod 33 may be fixed in the flanges of the saddle 29 so as to pivotly support an L-shaped locking bar 35. Thus, the locking bar is pivotly mounted with respect to the gate 23 which, in turn, is pivotly mounted within the housing 15. Consequently, the locking bar 35 is subjected to compound motion.

Figure 2:
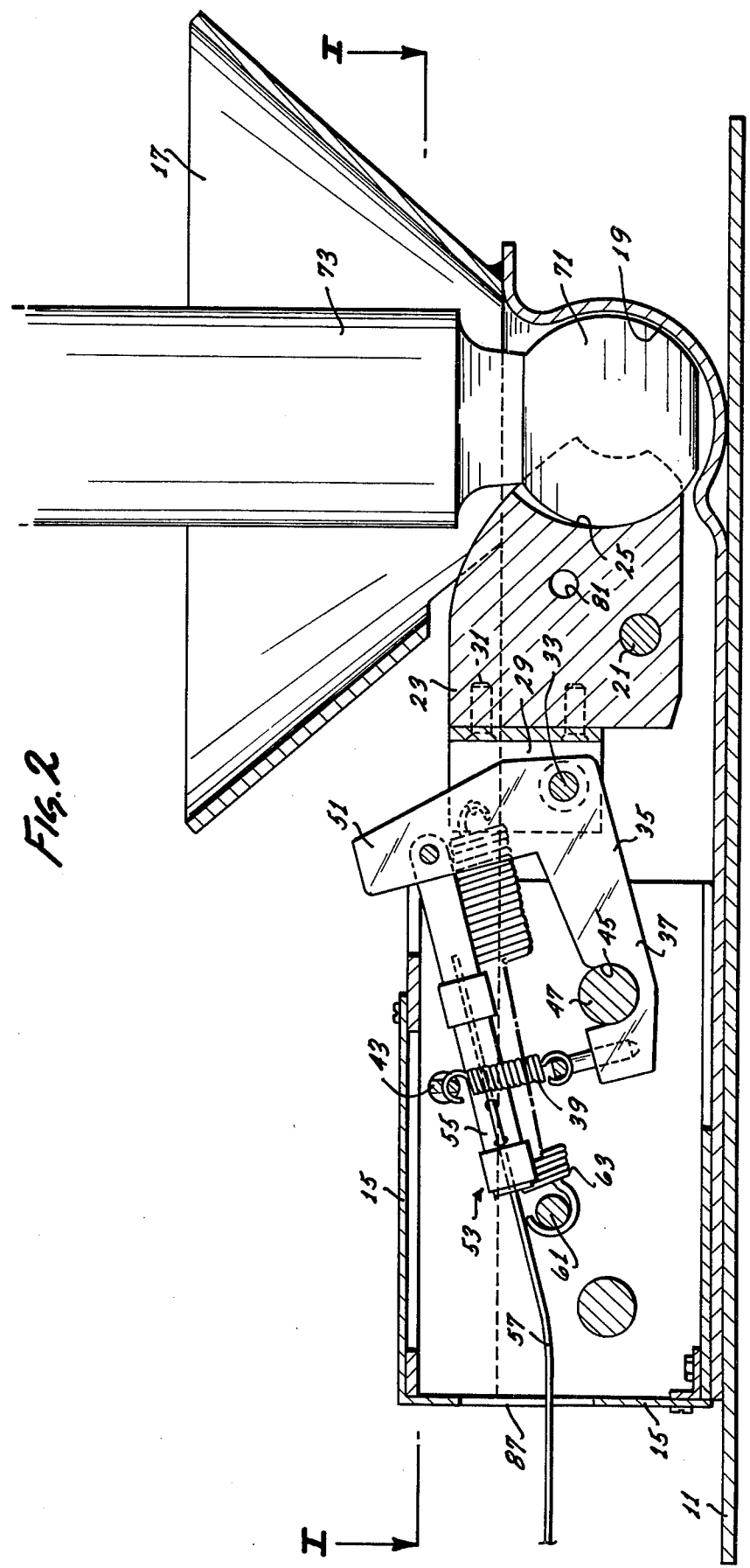
FIG. 2 comprises a plan view, partly in section, illustrating the embodiment of FIG. 1 with a spherical element captured therein.

Near one end of a leg 37 of the locking bar 35, a coiled spring 39 may be attached to exert a force against leg 37, tending to draw it about pivot 33 in a clockwise direction, as seen in FIGS. 2–4. The opposite end of the spring may be connected to a bar 43 which extends between the opposite sides of the housing 15.

Within the leg 37, a detent slot 45 may be formed having a radius substantially equal to that of a locking bar 47 which is fixed between the walls of the housing. Locking bar 47 may also be employed to provide structural integrity to the housing.

To the second leg 51 of the locking bar 35, a manual release element 53 may be attached which may, for example, comprise a pin 55 which is pivotally connected at one end to the leg 51 and which is fixedly connected near its other end to a wire or line 57.

Extending between the saddle 29 and a rod 61 which is fixed between the walls of the housing 15, may be one or more springs 63 which tend to draw the gate 23 in a counter-clockwise direction about pivot 21, as illustrated in FIGS. 2–4.

Turning now more particularly to FIG. 2, it can be seen that in this illustration, a spherical element 71, resembling a trailer ball, may be attached to any type of vehicle, such as a boat, for example, by means such as a shaft 73. The spheroid or ball 71 is seen to be captured between the locking seat or surface 19 and the locking or seating surface 25 since the opening formed between these two surfaces at the location thereof closest to the funnel-like element 17 is smaller than the diameter of the ball. Consequently, with the remainder of the structure, which will now be described, in the position illustrated, force exerted on the shaft 73 will not allow the ball to be pulled from between the locking and seating surfaces.

As can be seen in FIG. 2, the previously discussed compound motion exerted on the locking bar 37 has caused the bar to be moved about the pivot point 21 and about its own pivot 33 so that the locking rod 47 is seated within the detent slot 45 under the influence of spring 39. Consequently, if a force is exerted on the shaft 73 in an attempt to pull the spheroid 71 out of the machine, such an action would tend to pivot gate 23 in the counter-clockwise direction, as seen in FIG. 2, but such rotation would be prohibited by the locking bar 37.

This prohibition results from the following principles: in order for gate 23 to pivot to an open position, it must pivot about rod 21. If the gate is so pivoted, pivot rod 33 must also move about rod 21 toward a position in which its axis would be coplanar with the axes of rod 47 and pivot 21. As the pivot rod 33 moves downwardly toward such a coplanar position, the distance between pivot 21 and slot 45 must increase. Due to the fact that the structures are relatively rigid although relatively movable, this means that locking slot 45 must generally move away from pivot 21 if the gate is to be released. However, locking rod 47 prevents this from happening due to its detent cooperation with slot 45 which is held thereagainst by spring 39. Thus, the sphere will remain firmly locked between the locking seat and the surface 25. In fact, if desired, a pin can be installed through an aperture 81 in the gate for cooperation with coaxially locatable apertures 83 (FIGS. 3 and 4) in the housing 15 to prevent even manual release of this mechanism.

However, with no pin installed between the apertures 81 and 83, the mechanism can be released by an operator, perhaps on the boat which is to be undocked, who may exert a pulling force on the line 57 which passes through an aperture 87 at the rear end of the housing 15. If desired, the line or wire 57 may conveniently extend to a position in which it is easily accessible to someone on the dock or on the boat. In any event, when a pulling force is exerted on the line 57, and thus through the pin 55, it exerts a counter-clockwise force on leg 51 of the locking bar 35, causing the slot 45 to be moved away from the rod 47 in the manner illustrated in FIG. 3. When this occurs, the spring or springs 63 will cause the gate 23 to move or be cocked a small distance, in the counter-clockwise direction as illustrated, about the pivot 21 to the location shown in FIG. 3.

Then, when a pulling force is exerted on the shaft 73, the ball or sphere 71 will act against the upper edge of the seating surface 25 on the gate, causing the gate to be pivoted about rod 21 from the position shown in FIG. 3 to that shown in FIG. 4. This motion can be accomplished since the locking bar slot 45 is now free to move further away from the pivot 21 since it has been released from contact from the rod 47.

When it is desired to dock a boat having such a ball 71 mounted thereon, the vessel may be moved forward so that the ball 71 is directed by the funnel 17 toward gate 23 and the locking surface 19. Thus, as the ball travels from the position in FIG. 4 toward and beyond that of FIG. 3, it will push the gate toward the closed position until, finally the ball is seated as shown in FIG. 2 and the spring 39 again causes the locking slot 45 to cooperate with the rod 47 to lock the gate.

Those skilled in the art will now realize that the above-described mechanism comprises a compound motion type of structure which requires one relatively movably pivoted detent element to move relative to a fixed pivot point. When this movement is prohibited, the device is firmly locked and attempted relative movement between the two structures cannot be accomplished. However, when this movement is not prohibited, the two structures may be locked to, or unlocked from, one another with ease.

Those skilled in the art will also realize that this invention may be employed in a wide variety of embodiments, many of which may not even structurally resemble that depicted and described here but which, nevertheless, employ the invention as described in the following claims.

I claim:
1. Apparatus for releasably fixing structures to one another comprising
   a generally spherical member including
      means for fixing said spherical member to a first structure and
   a receiver member comprising
      a housing, means in said housing for seating said spherical member including
         movable gate means pivotally mounted in said housing for movement between a first, sphere-released position, a second, sphere-engaged position, and a third, sphere-locked position,
      locking bar means pivotally connected to said gate means and having
         slot means formed near one end thereof,
      a locking rod fixed in said housing in position to be received in said locking bar slot when said gate means is in said third position and to guide longitudinal movement of said locking bar during movement of said gate means,
      first means for urging said locking bar toward the position in which said locking rod is seated in said slot,
      second means for urging said gate means toward said first position, and
      means for manually overcoming the force of said first urging means to move said locking bar slot away from said locking rod.

2. The apparatus of claim 1 wherein
   said seating means in said housing seats said generally spherical member and cooperates with said gate means to hold said spherical member therebetween.

3. The apparatus of claim 2 including
   means for directing said spherical member toward said seating means when said spherical member is located within a predetermined relationship relative to said seating means.

4. Apparatus for releasably locking structures to one another comprising
   a housing,
   means for fixing said housing to a first structure,
   funnel-like means formed on said housing terminating at the narrow end,
   a locking seat in said housing adjacent to said narrow end of said funnel-like means,
   gate means mounted in said housing having
      locking means thereon for cooperation with said locking seat to hold an element of predetermined configuration therebetween,
   pivot means in said housing for pivotally mounting said gate means relative to said locking seat,
   saddle means fixed to said gate means,
   locking bar means pivotally fixed to said saddle means and including
      a first section having
         locking slot means formed therein and
         means for constantly pulling said first section in a first direction to a position in which said locking slot is operable to prohibit movement of said gate means and
      a second section having
         means for selectively pulling said first section in a second direction to a position in which said locking slot is inoperable to prohibit movement of said gate means,
   locking rod means fixed in said housing for cooperation with said locking slot when said first section has been moved to the limit of its movement in said first direction,
   means for urging said gate means toward a location remote from said locking seat, and
   means having a predetermined configuration on the surface thereof and fixed to a second structure for capture between said locking seat and said gate means.

5. The apparatus of claim 4 including
   means for pivotally mounting said locking bar means on said saddle means so that said locking bar means moves both with and relative to said gate means when the latter is moved about said gate means pivot means.

6. The apparatus of claim 4 wherein
   said locking bar means comprises
      a substantially L-shaped member in which said first and second sections are substantially perpendicular legs thereof.

7. The apparatus of claim 4 wherein
   said first locking bar means section includes
      a guide surface thereon adjacent to and terminating in said slot for abutting cooperation with said locking rod to limit movement of said gate means.

8. The apparatus of claim 4 including
   means, receivable in said funnel-like means to be locked between said locking seat and said gate means, for being fixed to a second structure.

9. In a locking device,
   a housing
   a locking seat in said housing
   gate means movably mounted in said housing for cooperation with said locking seat and having
      a locking surface thereon for cooperation with said locking seat to selectively hold a fixture of predetermined configuration therebetween, and
   means for controlling movement of said gate means between a first position for receipt of a fixture into said locking seat and a second position in which such a fixture is held in said seat by said gate means comprising
      locking bar means operatively connected to said gate means for movement therewith when said gate means is moved from the first position to the second position including
         locking means in said bar for releasably retaining said gate means in the second position,
      means fixed in said housing for cooperation with said locking means to so retain said gate means,
      means for urging said bar in a direction such that said retaining means will so cooperate with said locking means, and
      means for urging said gate means toward the first position thereof.

10. The device of claim 9 wherein
   said locking bar means include
      a guide surface thereon adjacent and terminating at said locking means for guiding the relative movement of said bar means and said retaining means when the latter is not in such cooperation with said locking means.

11. The device of claim 10 wherein
said locking bar means comprises
a substantially L-shaped member having
a first leg, including said locking means and said guide surface, upon which said urging means acts and
a second leg which is angularly related to said first leg, and said device further includes
manually operable means connected to said second leg for selectively causing relative movement between said retaining means and said locking means to release them from such cooperation.

12. The device of claim 9 including
means for pivotally connecting said locking bar means to said gate means for relative movement therebetween when said gate means is moved from the first position to the second position.

13. The device of claim 9 including
means for urging said gate means from the second position to the first position.

14. The device of claim 13 including
means for selectively releasing said locking means and said retaining means from such cooperation whereby said gate urging means is conditioned to release an object captured between it and said locking seat.

15. A locking device comprising
a locking seat having an operable configuration approximately the same as the periphery of a cooperative structure to be seated therein,
gate means pivotally mounted in fixed relationship to said seat for limited movement relative thereto and having
a seating surface thereon having an operable configuration approximately the same as the periphery of a cooperative structure to be seated in said locking seat, said gate means being movable from
a first position in which said seating surface is oriented so as to be moved toward said locking seat by such a cooperative structure to hold such a cooperative structure therebetween, to
a second position in which said seating surface is located so as to releasably hold such a cooperative structure between said locking seat and said seating surface, and from said second position to
a third position in which said seating surface is located so as to lock such a cooperative structure between said locking seat and said seating surface,
means for locking said gate means in said third position comprising
a locking bar movably connected to said gate means and having
means thereon for fixing said locking bar against movement relative to said gate means and, thus, for prohibiting pivotal movement of said gate means relative to said locking seat,
means, fixed relative to said locking seat, for cooperation with said fixing means to so fix said locking bar,
means for urging said locking bar toward a position in which said fixing means and said cooperating means act to so fix said locking bar, and
means for manually actuating said locking bar to release said fixing and cooperating means and move said gate means from said third position to said second position.

16. The device of claim 15 including
means for urging said gate means from said third position to said second position and from said second position to said first position.

17. The device of claim 16 including
means for preventing movement of said gate means out of said third position by preventing actuation of said locking bar by said manual actuating means.

18. The device of claim 15 including
means on said gate means for pivotally mounting said locking bar thereon.

19. Apparatus for preventing relative movement between two elements comprising
a first element having
first pivot means thereon and
a locking surface thereon,
a second element pivotally mounted on said first pivot means and having
second pivot means fixed thereon and
a locking surface thereon operatively positioned relative to said first element locking surface,
a locking means pivotally mounted on said second pivot means and having
first detent means thereon,
second detent means fixed in said first element,
means for urging said locking means about said pivot means such that said first and second detent elements cooperatively fix the distance between first pivot means and said said first detent means and thereby prohibit pivoting of said second element about said first pivot means in one direction and maintain said first and second element locking surfaces in cooperative, locking relationship, and
means for moving said locking means about said second pivot means to release said first and second detent means and allow enlargement of the distance between said first pivot means and said first detent means to allow pivoting of said second element about said first pivot means in the one direction and at least partial separation of said first and second element locking surfaces.

* * * * *